United States Patent [19]

Harnisch et al.

[11] 4,053,562

[45] Oct. 11, 1977

[54] PRODUCTION OF ALKALI METAL PHOSPHATE SOLUTIONS OF LOW VANADIUM CONTENT

[75] Inventors: Heinz Harnisch, Cologne-Lovenich; Klaus-Peter Ehlers, Erftstadt-Lechenich; Klaus Schrödter, Cologne, all of Germany

[73] Assignee: Hoechst Aktiengesellschaft, Germany

[21] Appl. No.: 698,332

[22] Filed: June 22, 1976

[30] Foreign Application Priority Data

June 28, 1975 Germany .................. 2528895

[51] Int. Cl.² .................. C01B 15/16; C01B 25/26; C01B 25/16
[52] U.S. Cl. .................. 423/313; 423/309; 423/321 R
[58] Field of Search .......... 423/307, 313, 309, 321 R; 260/513.7

[56] References Cited

U.S. PATENT DOCUMENTS

| | | | |
|---|---|---|---|
| 2,150,921 | 3/1939 | Havas | 260/513.7 |
| 2,977,191 | 3/1961 | Poltiez | 423/315 |
| 3,042,609 | 7/1962 | Hughes | 260/513.7 |
| 3,305,305 | 2/1967 | Peterson | 423/313 |
| 3,493,336 | 2/1970 | Milling | 423/313 |

FOREIGN PATENT DOCUMENTS 1,143,496 2/1963 Germany .................. 423/305

*Primary Examiner*—O. R. Vertiz
*Assistant Examiner*—Gregory A. Heller
*Attorney, Agent, or Firm*—Connolly and Hutz

[57] ABSTRACT

Alkali metal phosphate solutions of low vanadium content are produced from wet-processed phosphoric acids contaminated with vanadium and iron. The acids containing vanadium and iron in the highest stage of oxidation are treated with a reductant to effect conversion of the vanadium and iron contaminants to a lower stage of oxidation, the resulting acids are neutralized by means of an alkaline liquor and/or alkali metal carbonate down to a pH of at least 3, and the resulting precipitate is separated. The reductant used is the sodium salt of hydroxymethane-sulfinic acid.

3 Claims, No Drawings

PRODUCTION OF ALKALI METAL PHOSPHATE SOLUTIONS OF LOW VANADIUM CONTENT

The present invention relates to a process for making alkali metal phosphate solutions of low vanadium content from wet-processed phosphoric acids being contaminated with vanadium and iron, wherein the acides containing vanadium and iron in the highest stage of oxidation are treated with a reductant to effect conversion of the vanadium and iron contaminants to a lower stage of oxidation, the resulting acids are neutralized by means of an alkaline liquor and/or alkali metal carbonate down to a pH of at least 3, and the resulting precipitate is separated.

In industry, alkali metal phosphate solutions are chiefly made into condensed alkali metal phosphates, particularly di- and triphosphates. These latter phosphates are used as important ingredients in substantially all current detergent compositions. It is, however, known that the presence even of traces of heavy metals, especially vanadium, in condensed phosphates which are colorless as such, causes the phosphates to assume an undesirable coloration, whereby their quality becomes considerably impaired.

Phosphoric acids produced by subjecting orthophosphates to wet-processing treatment contain a plurality of contaminants together with up to 1000 ppm (ppm stands for part per million) of vanadium, based on $P_2O_5$. The removal of the vanadium contaminant has long been a special problem in the purification of the acids by neutralization.

It has been disclosed that it is possible to precipitate vanadium in the form of insoluable complex ferrovanadylophosphato-compounds during the neutralization of crude phosphoric acid. To achieve this, it is necessary to provide for a sufficiently high content of iron(II) ions in the acids during neutralization. In addition to this, it is necessary for the vanadium to be in one of its lower oxidation stages, e.g. the fourth or third, which is ensured by the presence of iron(II) ions. Despite all attempts made heretofore which have been disclosed in the literature, it has not been possible to provide satisfactory means permitting a sufficiently high iron(II) concentration to be established in crude phosphoric acid. As disclosed in German Patent Specification No. 1,065,388, attempts have been made to admix crude phosphoric acid with metallic iron, zinc or ferrosulfate, prior to, or during, the neutralization. This has been found to effect the formation of a so-called "reduced vanadium complex" which is obtained during neutralization as an insoluble precipitate and can be separated from the purified alkali metal phosphate solution. One of the disadvantages of this process resides in the fact that important quantities of $P_2O_5$ becomes chemically combined with the iron, which is added in proportions of 0.17 up to 0.25 kg per kg of $P_2O_5$, whereby the yield of desirable product is considerably impaired. In addition to this, the metallic addends give rise to the evolution of hydrogen which is hazardous so that additional equipment is required to be used in industry.

A further method of establishing a sufficiently high concentration of iron(II) has been disclosed, wherein an acid containing iron in the third stage of oxidation is treated with a suitable reductant to effect transformation of the iron to the second stage of oxidation. This operation is difficult to achieve inasmuch as iron, which is in the third oxidation stage, tends to form an extremely stable complex compound with phosphoric acid.

A still further process, wherein an alkali metal sulfide or hydrogen sulfide is used to effect the reduction in a complicated and time-consuming operation, has been disclosed in Austrian Patent Specification No. 151,948. In order to enable full use to be made of the hydrogen sulfide, it is necessary for the components to be united under pressure or to be contacted countercurrently, naturally with considerable expenditure of equipment. In order to reduce the iron as completely as possible, it is necessary to effect the reaction over a period of several hours. In addition to this, hydrogen sulfide is a highly toxic compound where extreme care has to be taken in handling relatively large quantities thereof.

A further process for reducing iron with the aid of dithionites has been disclosed in German Patent Specification No. 1,567,619, wherein relatively large proportions of dithionite are used in an attempt to reduce the iron as quantitatively as possible. Dithionites are very expensive products which do not add to the economy of this process. In addition to this, dithionites are highly hygroscopic and readily decomposable compounds whose commercial uses are limited.

In accordance with our present invention we now provide a technically simple and commercially attractive process, wherein iron contained in crude phosphoric acid is converted from the third to the second stage of oxidation, and vanadium is simultaneously converted from the fifth to one of its lower oxidation stages. In other words, the invention provides for the subsequent neutralization of the crude acids to be effected under the conditions necessary to almost quantitatively precipitate vanadium from the resulting solutions, and separate it by filtration.

To achieve this, the invention provides for the sodium salt of hydroxymethanesulfinic acid to be used as the reductant.

One of the advantages of the present invention resides in the fact that the sodium salt of hydroxymethanesulfinic acid is a reductant substantially more powerful than all other products used heretofore for the same purpose. Only as little as about 0.6 mol of the present reductant is required to be used for reducing 1 mol of iron. As compared therewith, 1.1 mol of dithionite reductant has to be used per mol of iron. In order to enable iron and vanadium to be completely converted to lower oxidation stages in crude phosphoric acid containing 0.5 weight % of Fe(III), based on $P_2O_5$, it is necessary to use 1.7 kg of sodium dithionite per 100 kg of $P_2O_5$, but only 0.5 kg of the sodium salt of hydroxymethanesulfinic acid.

A further advantage of the present reductant resides in the fact that it can be safely handled in non-irritating fashion. In clear contrast with dithionites, which have a strong specific smell and undergo decomposition in contact with air, the sodium salt of hydroxymethanesulfinic acid is an odorless white powder. Even in contact with air, the powder continues to remain stable for some prolonged time so that it can reliably be used in industry.

The present reductant may be added as such to phosphoric acid or may be dissolved in a sodium hydroxide solution of 10 up to 30 weight % strength. Alkaline solutions of the sodium salt of hydroxymethanesulfinic acid remain stable over several days without any significant loss of reducing power.

The sodium salt of hydroxymethanesulfinic acid should preferably be used in an amount of 600 % up to 1000 %, based on the vanadium contained in the phosphoric acid.

It is also preferable for the alkaline liquor and/or alkali metal carbonate to be added in the quantities necessary to establish a pH of at least 3 and for the resulting precipitate to be separated. In this case, the resulting alkali metal phosphate solutions contain less than 20 ppm of vanadium, based on $P_2O_5$. These are solutions which are particularly well adapted for use in making colorless condensed alkali metal phosphates.

EXAMPLE 1

320 g of phospheric acid, which was prepared from Khouribga phosphate and contained 31.3 weight % of $P_2O_5$, 0.17 weight % of Fe and 130 ppm of V, was heated to 80° C and 540 mgg of the sodium salt of hydroxymethanesulfinic acid ($NaSO_2$—$CH_2OH$) was added with agitation. The resulting solution was neutralized by means of a sodium hydroxide solution (50 weight %) over the period necessary to convert the entire quantity of phosphoric acid to disodium phosphate, and the precipitate was filtered off. The solution so produced contained 20.7 weight % of $P_2O_5$ and 2 ppm of V, based on $P_2O_5$.

EXAMPLE 2

350 g of crude phosphoric acid, which was prepared from Kola phosphate and contained 28.6 weight % of $P_2O_5$, 0.19 weight % of Fe and 100 ppm of V, as heated to 80° C and 3 g of a 10 weight % sodium hydroxide solution containing 600 mg of the sodium salt of hydroxymethanesulfinic acid was added with agitation. Following this, the phosphoric acid was neutralized by means of a 50 weight % sodium hydroxide solution until the acid was in the form of a mixture of 66.6 weight % of monosodiumphosphate and 33.3 weight % of disodium phosphate. The precipitate was separated, the solution was evaporated to dryness, and the residue was annealed for about 2 hours at 400° C. The sodium triphosphate so made contained 57.6 weight % of $P_2O_5$ and 5 ppm of V, based on $P_2O_5$. The degree of whiteness of the product was identified at wave lengths of 427 and 577 mm, respectively, and found to be 96.2 % and 97.5 %, respectively, of that of analytically pure MgO.

We claim:

1. In a process for making alkali phosphate solutions of low vanadium content from wet-processed phosphoric acids contaminated with vanadium and iron, wherein the acids containing vanadium and iron in the highest stage of oxidation are treated with a reductant to effect conversion of the vanadium and iron comtaminants to a lower stage of oxidation, the resulting acids are neutralized by means of an alkaline liquor or alkali metal carbonate or mixture thereof down to a pH of a least 3, and the resulting precipitate is separated, the improvement which comprises using the sodium salt of hydroxymethanesulfinic acid as the reductant.

2. The process of claim 1, wherein the reductant is dissolved in a 10–30 weight % sodium hydroxide solution.

3. The process of claim 1, wherein the amount of reductant is 600–1000%, based on the vanadium contained in the phosphoric acid.

* * * * *